United States Patent
Heckmeier et al.

(10) Patent No.: US 6,890,607 B2
(45) Date of Patent: *May 10, 2005

(54) LIQUID-CRYSTALLINE MEDIUM

(75) Inventors: Michael Heckmeier, Hemsbach (DE); Brigitte Schuler, Gross-Ostheim (DE); Izumi Saito, Darmstadt (DE); Volker Reiffenrath, Rossdorf (DE); Georg Luessem, Ober-Ramstadt (DE); Christian Hock, Mainaschaff (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,730

(22) Filed: Jul. 8, 2004

(65) Prior Publication Data

US 2004/0256600 A1 Dec. 23, 2004

Related U.S. Application Data

(62) Division of application No. 10/445,032, filed on May 27, 2003, now Pat. No. 6,827,990.

(30) Foreign Application Priority Data

May 24, 2002 (DE) .......................... 102 23 061

(51) Int. Cl.⁷ ...................... C09K 19/30; C09K 19/34; C09K 19/12; C09K 19/20
(52) U.S. Cl. ............. 428/1.1; 252/299.61; 252/299.63; 252/299.66; 252/299.67
(58) Field of Search ...................... 428/1.1; 252/299.61, 252/299.63, 299.66, 299.67

(56) References Cited

U.S. PATENT DOCUMENTS 6,007,740 A  12/1999  Andou et al.
6,187,223 B1  2/2001  Andou et al.
6,827,990 B2 * 12/2004  Heckmeier et al. .......... 428/1.1

* cited by examiner

Primary Examiner—Shean C. Wu
(74) Attorney, Agent, or Firm—Millen, White, Zelano, Branigan, P.C.

(57) ABSTRACT

A liquid-crystalline medium based on a mixture of polar compounds of positive dielectric anisotropy, which contains one or more compounds of the formula I

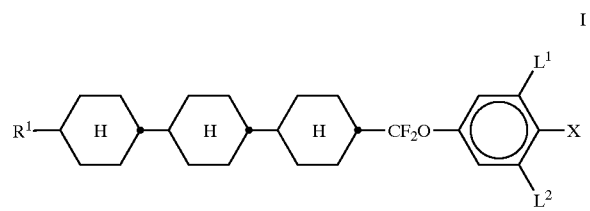

in which
$R^1$ is a halogenated or unsubstituted alkyl or alkoxy radical having from 1 to 15 carbon atoms, where one or more $CH_2$ groups in these radicals are optionally, independently of one another, replaced by —C≡C—, —CH=CH—, —O—, —CO—O— or —O—CO— in such a way that O atoms are not linked directly to one another, X is $SF_5$, and $L^1$ and $L^2$ are each, independently of one another, H or F. The media are useful in electro-optical liquid crystal displays.

18 Claims, No Drawings

LIQUID-CRYSTALLINE MEDIUM

This application is a divisional of U.S. Ser. No. 10/445,032, filed May 27, 2003, now U.S. Pat. No. 6,827,990.

The present invention relates to a liquid-crystalline medium, to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapor pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

extended nematic phase range (in particular down to low temperatures)

stable on storage, even at low temperatures the ability to switch at extremely low temperatures (outdoor use, automobile, avionics)

increased resistance to UV radiation (longer service life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has an object of providing media, in particular for MLC, TN or STN displays of this type, which do not have the above-mentioned disadvantages or only do so to a reduced extent, and preferably simultaneously have very high specific resistance values and low threshold voltages.

Upon further study of the specification and appended claims, further objects and advantages of this invention will become apparent to those skilled in the art.

It has now been found that these and other objects can be achieved if media according to the invention are used in displays.

The invention thus relates to a liquid-crystalline medium based on a mixture of polar compounds of positive dielectric anisotropy, characterized in that it comprises one or more compounds of the formula I

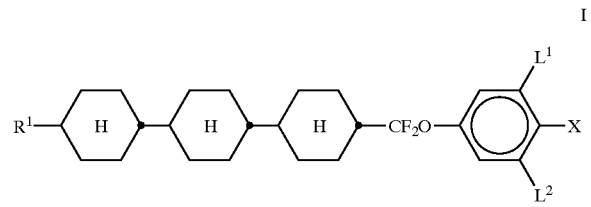

I in which $R^1$ is a halogenated or unsubstituted alkyl or alkoxy radical having from 1 to 15 carbon atoms, where, in addition, one or more $CH_2$ groups in these radicals may each, independently of one another, be replaced by —C≡C—, —CH=CH—, —O—, —CO—O— or —O—CO— in such a way that O atoms are not linked directly to one another, X is F, Cl, CN, $SF_5$, a halogenated alkyl radical, a halogenated alkenyl radical, a halogenated alkoxy radical or a halogenated alkenyloxy radical having up to 6 carbon atoms, $L^1$ and $L^2$ are each, independently of one another, H or F.

The compounds of the formula I have a broad range of applications. Depending on the choice of substituents, these compounds can serve as base materials of which liquid-crystalline media are predominantly composed; however, it is also possible to add compounds of the formula I liquid-crystalline base materials from other classes of compound in order, for example, to modify the dielectric and/or optical anisotropy of a dielectric of this type and/or in order to optimize its threshold voltage and/or its viscosity.

In the pure state, the compounds of the formula I are colorless and form liquid-crystalline mesophases in a temperature range which is favorably located for electro-optical use. They are stable chemically, thermally and to light.

If $R^1$ in the formula I is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^1$ is an alkyl radical in which one $CH_2$ group has been replaced by —CH=CH—, this may be straight-chain or branched. It is preferably straight-chain and has 2 to 10 carbon atoms. Accordingly, it is in particular vinyl, prop-1- or prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^1$ is an alkyl radical in which one $CH_2$ group has been replaced by —O— and one has been replaced by —CO—, these are preferably adjacent. These thus contain an acyloxy group —CO—O— or an oxycarbonyl group —O—CO. These are preferably straight-chain and have 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$ is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 12 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ is an alkyl or alkenyl radical which is monosubstituted by CN or $CF_3$, this radical is preferably straight-chain. The substitution by CN or $CF_3$ is in any desired position.

If $R^1$ is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^1$ may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals $R^1$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^1$ is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 9-biscarboxyethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. The compounds of the formula I can be prepared, for example, as described in DE 4006921, WO 01/64667 and DE 10105314.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude.

The achievable combinations of clearing point, viscosity at low temperature, thermal and UV stability and dielectric anisotropy are far superior to previous materials from the prior art.

The requirement for a high clearing point, a nematic phase at low temperature and a high $\Delta\varepsilon$ has hitherto only been achieved to an inadequate extent. Although mixtures such as, for example, ZLI-3119 have a comparable clearing point and comparably favorable viscosities, they have, however, a $\Delta\varepsilon$ of only +3. Other mixture systems have comparable viscosities and $\Delta\varepsilon$ values, but only have clearing points in the region of 60° C.

The liquid-crystal mixtures according to the invention, for example while retaining the nematic phase down to −20° C. and preferably down to −30° C., particularly preferably down to −40° C., preferably enable a clearing point above 60° C., more preferably above 65° C., particularly preferably above 70° C., simultaneously dielectric anisotropy values $\Delta\varepsilon$ preferably of $\geq 6$, more preferably $\geq 8$, and a high value for the specific resistance to be achieved, enabling excellent STN and MLC displays to be obtained. In particular, the mixtures are characterized by low operating voltages. The TN thresholds are preferably below 2.0 V, more preferably below 1.7 V, particularly preferably <1.3 V.

It goes without saying that, through a suitable choice of the components of the mixtures according to the invention, it is also possible for higher clearing points (for example above 110° C.) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\varepsilon$ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975] are used, where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 $mm^2 \cdot s^{-1}$, particularly preferably <50 $mm^2 \cdot s^{-1}$. The rotational viscosity $\gamma_1$ at 20° C. of the mixtures according to the invention is preferably <160 mPa·s, particularly preferably <150 mPa·s. The nematic phase range is preferably at least 90°, in particular at least 100°. This range preferably extends at least from −20° to +80° C.

A short response time is desired in liquid-crystal displays. This applies in particular to displays which are capable of video reproduction. For displays of this type, response times (total: $t_{on}+t_{off}$) of at most 25 ms are required. The upper limit of the response time is determined by the image refresh frequency. Besides the rotational viscosity $\gamma_1$, the tilt angle likewise affects the response time. In particular, mixtures comprising $\geq 20\%$ of the compounds of the formula I exhibit a tilt angle of >2.5, preferably >3.0, compared with the commercial product ZLI-4792 from Merck KGaA.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenyl-cyclohexanes of the formula

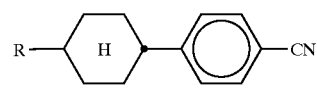

or esters of the formula

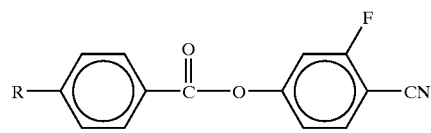

instead of the compounds of the formula I.

The UV stability of the mixtures according to the invention is also considerably better, i.e. they exhibit a significantly smaller decrease in the HR on exposure to UV.

Particularly preferred compounds of the formula I are compounds of the formulae I-1 to I-9:

I-1
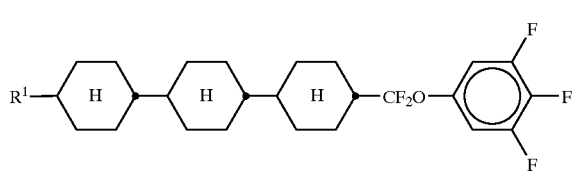

I-2
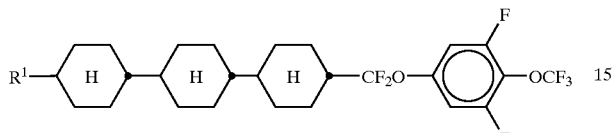

I-3
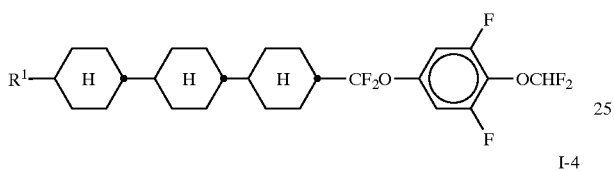

I-4
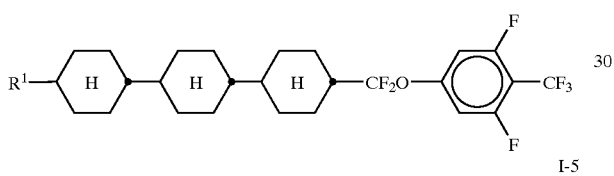

I-5
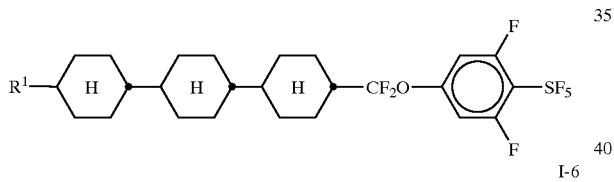

I-6
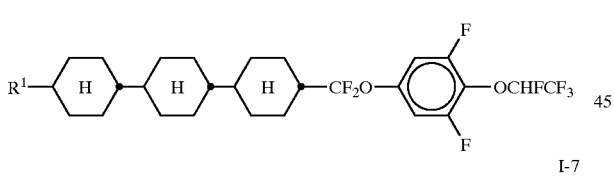

I-7
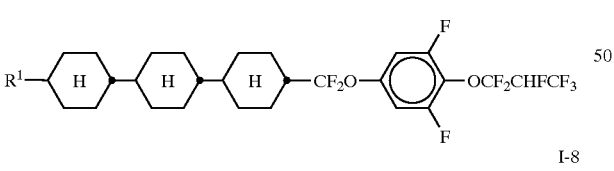

I-8
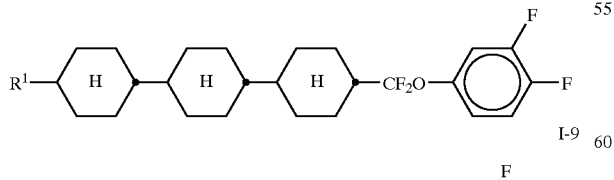

I-9 in which $R^1$ is as defined in the formula I.

Of these preferred compounds, particular preference is given to those of the formulae I-1, I-2, I-3 and I-4, in particular those of the formulae I-1 and I-2.

Preferred embodiments are indicated below:

the medium comprises one, two or more compounds of the formulae I-1 to I-9;

the medium additionally comprises one or more compounds selected from the group consisting of the general formulae II to VI:

II
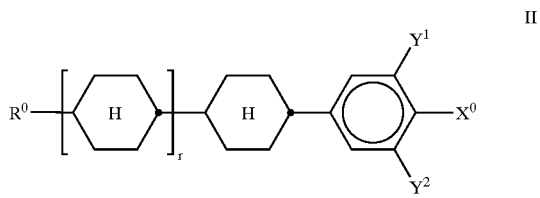

III
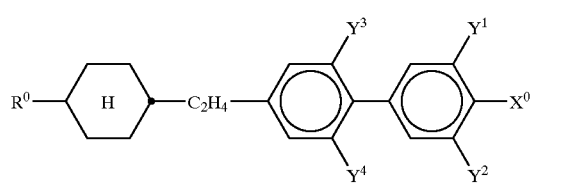

IV
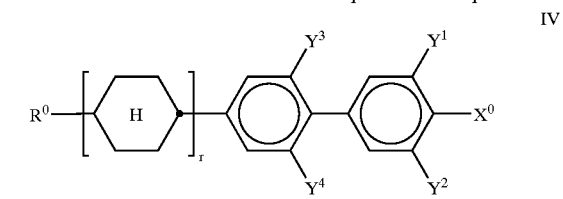

V
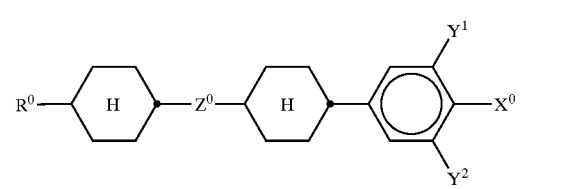

VI
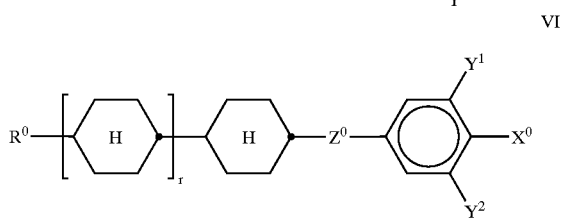

in which the individual radicals have the following meanings:

$R^0$ is n-alkyl, oxaalkyl, fluoroalkyl or alkenyl, each having up to 9 carbon atoms, $X^0$ is F, Cl, halogenated alkyl, halogenated alkenyl, halogenated alkenyloxy or halogenated alkoxy having up to 6 carbon atoms, $Z^0$ is —$C_2F_4$—, —CF=CF—, —$C_2H_4$—, —$(CH_2)_4$—, —$OCH_2$—, —$CH_2O$—, —$CF_2O$— or —$OCF_2$—, $Y^1$ to $Y^4$ are each, independently of one another, H or F, r is 0 or 1.

The compound of the formula IV is preferably

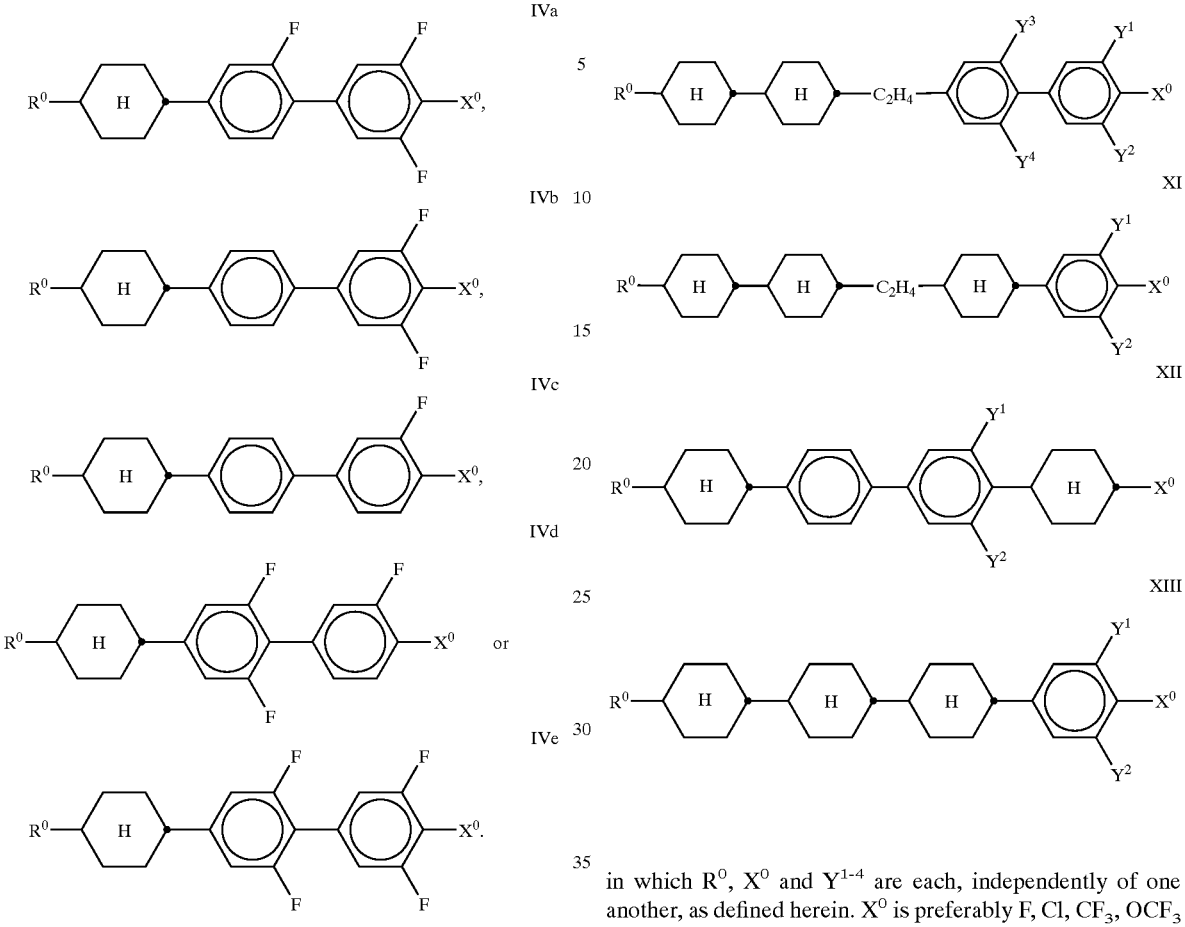

the medium additionally comprises one or more compounds selected from the group consisting of the general formulae VII to XIII:

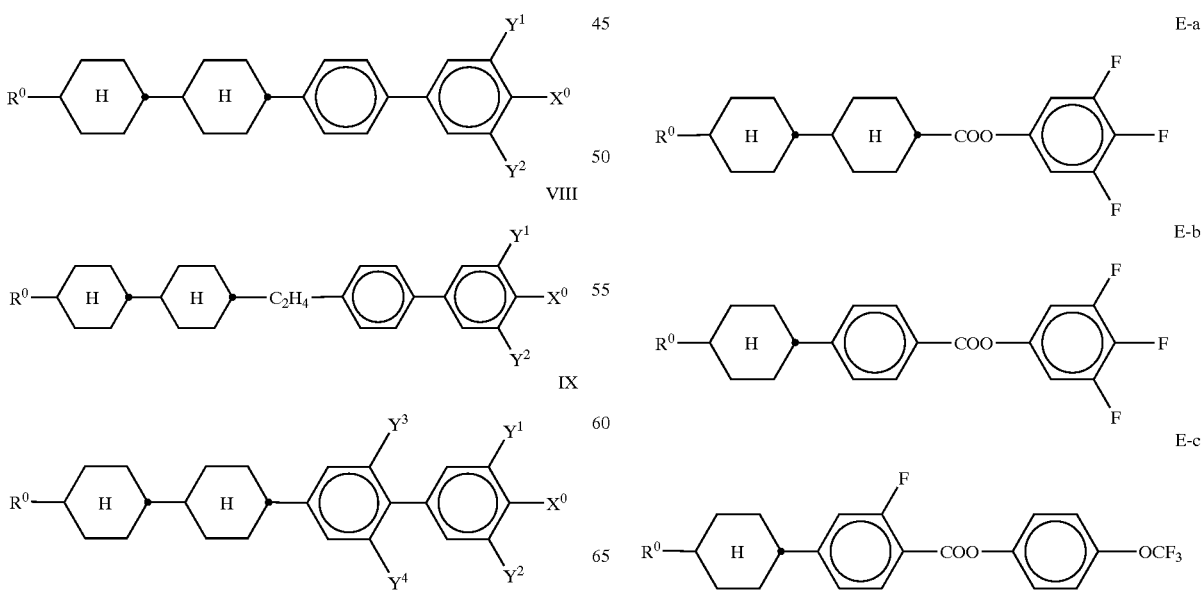

in which $R^0$, $X^0$ and $Y^{1-4}$ are each, independently of one another, as defined herein. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The medium additionally comprises one or more compounds of the formulae E-a to E-d -continued E-d

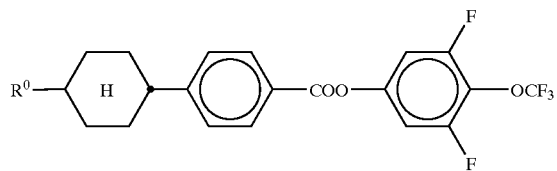

in which R⁰ is as defined herein;

the proportion of the compounds of the formulae E-a to E-d is preferably 10–30% by weight, in particular 15–25% by weight;

the proportion of compounds of the formulae I to VI together in the mixture as a whole is at least 50% by weight;

the proportion of compounds of the formula I in the mixture as a whole is from 0.5 to 40% by weight, particularly preferably from 1 to 30% by weight;

the proportion of compounds of the formulae II to VI in the mixture as a whole is from 30 to 80% by weight;

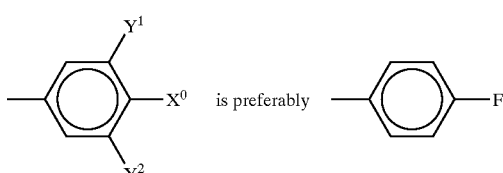

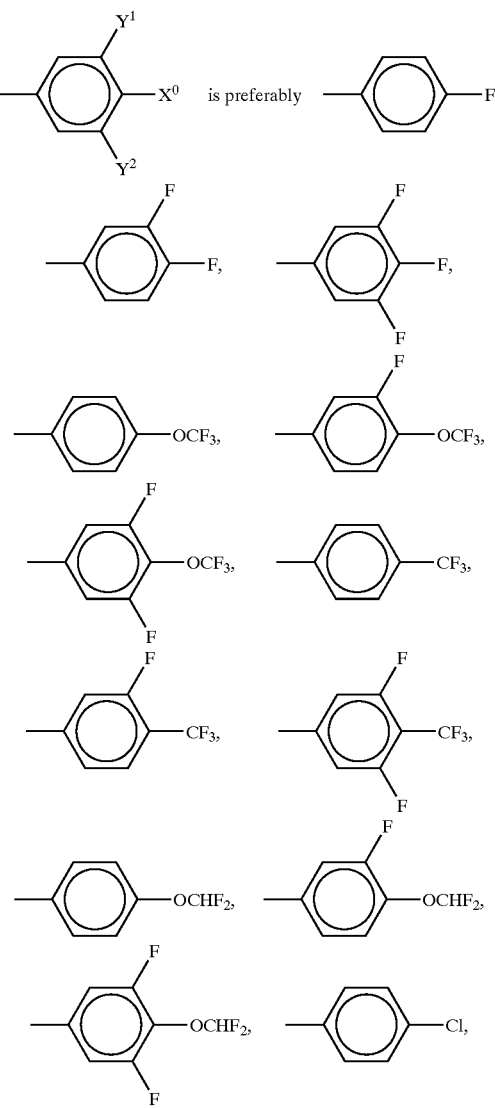

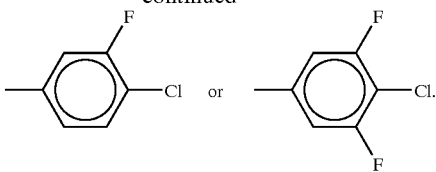

the medium comprises compounds of the formulae II, I, IV, V and/or VI;

R⁰ is straight-chain alkyl or alkenyl having from 2 to 7 carbon atoms;

the medium essentially consists of compounds of the formulae I to VI and XIII;

the medium comprises further compounds, preferably selected from the following Croup consisting of the general formulae XIV to XVIII:

XIV

XV

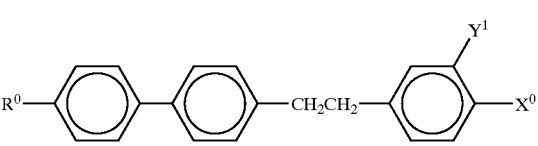

XVI

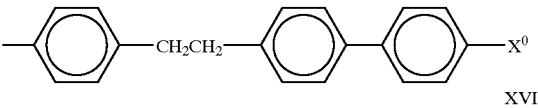

XVII

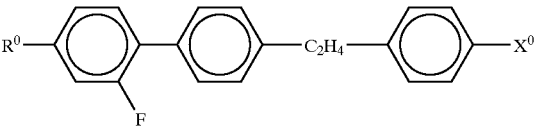

XVIII

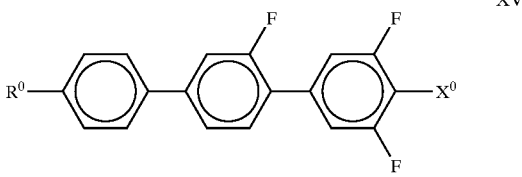

in which R⁰ and X⁰ are as defined above. The 1,4-phenylene rings may additionally be substituted by CN, chlorine or fluorine. The 1,4-phenylene rings are preferably monosubstituted or polysubstituted by fluorine atoms.

The medium additionally comprises one, two, three or more, preferably two or three, compounds of the formulae

O1

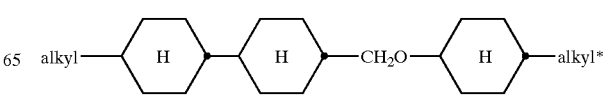

-continued

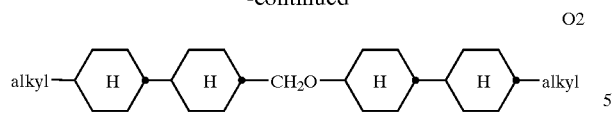
O2 in which "alkyl" and "alkyl*" are as defined below. The proportion of the compounds of the formulae O1 and/or O2 in the mixtures according to the invention is preferably 5–10% by weight.

The medium preferably comprises 5–35% by weight of compound IVa.

The medium preferably comprises one, two or three compounds of the formula IVa in which $X^0$ is F or $OCF_3$.

The medium preferably comprises one or more compounds of the formulae IIa to IIg

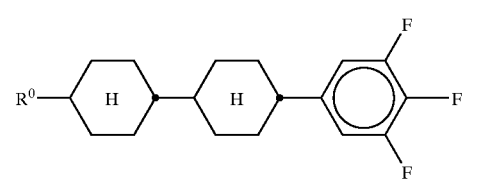
IIa

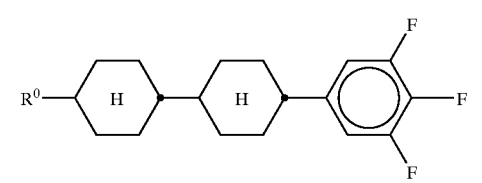
IIb

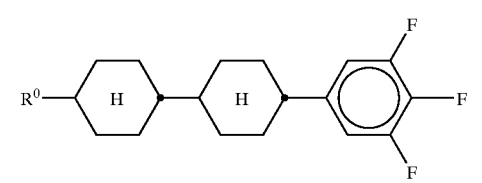
IIc

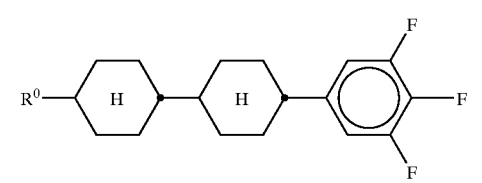
IId

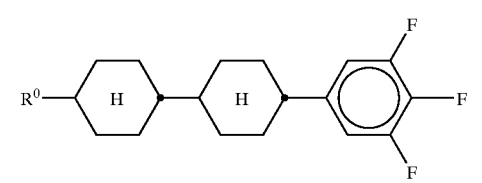
IIe

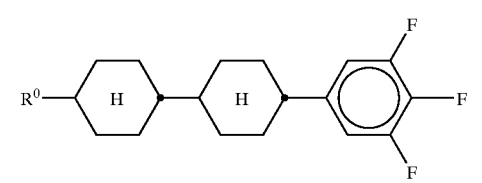
IIf

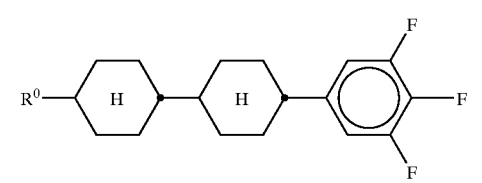
IIg in which $R^0$ is as defined above. In the compounds of the formulae IIa–IIg, $R^0$ is preferably methyl, ethyl, n-propyl, n-butyl or n-pentyl.

The medium preferably comprises one or more compounds of the formulae

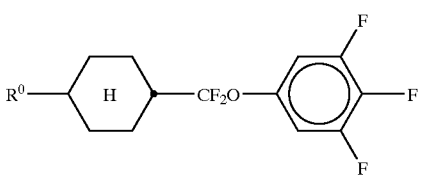

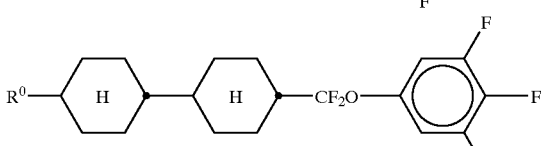

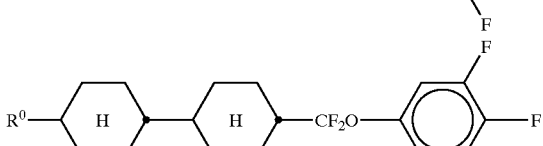

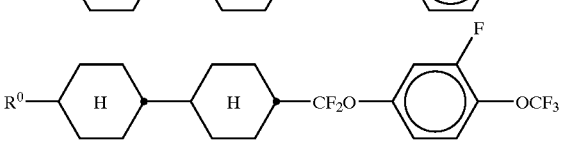

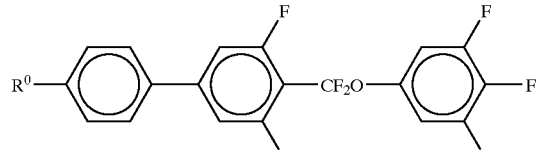

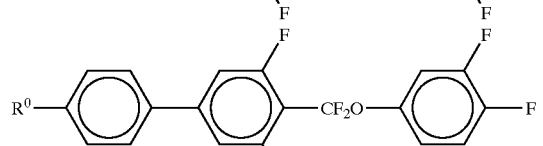

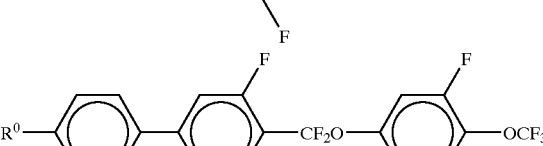

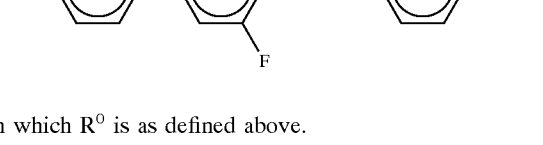

in which $R^0$ is as defined above.

The (I): (II+III+IV+V+VI) ratio by weight is preferably from 1:10 to 10:1.

The medium essentially consists of compounds selected from the group consisting of the general formulae I to XIII.

The proportion of the compounds of the formula IVb and/or IVc in which $X^0$ is fluorine and $R^0$ is $CH_3$, $C_2H_5$, n-$C_3H_7$, n-$C_4H_9$ or n-$C_5H_{11}$ in the mixture as a whole is from 2 to 20% by weight, in particular from 2 to 15% by weight.

The medium preferably comprises compounds of the formulae II to VI in which $R^0$ is methyl.

The medium particularly preferably comprises compounds of the formulae

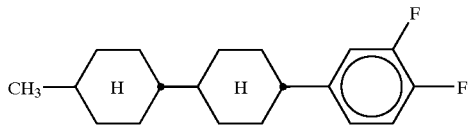

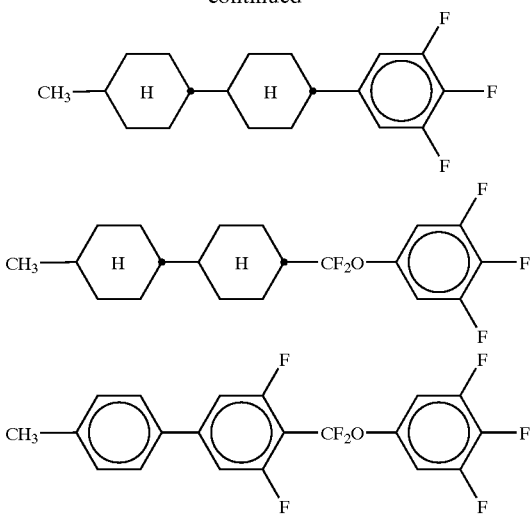

The medium preferably comprises one, two or more, preferably one or two, dioxane compounds of the formulae

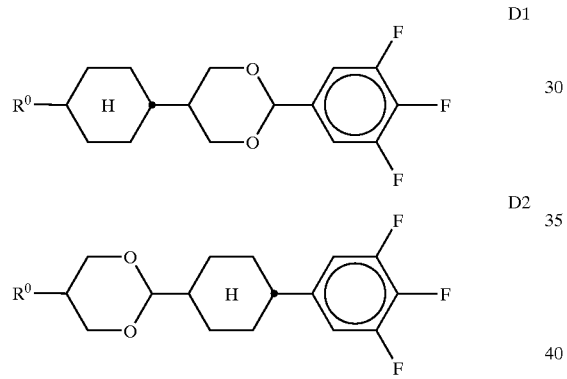

The medium additionally comprises one, two or more bicyclic compounds of the formulae Z1 to Z6

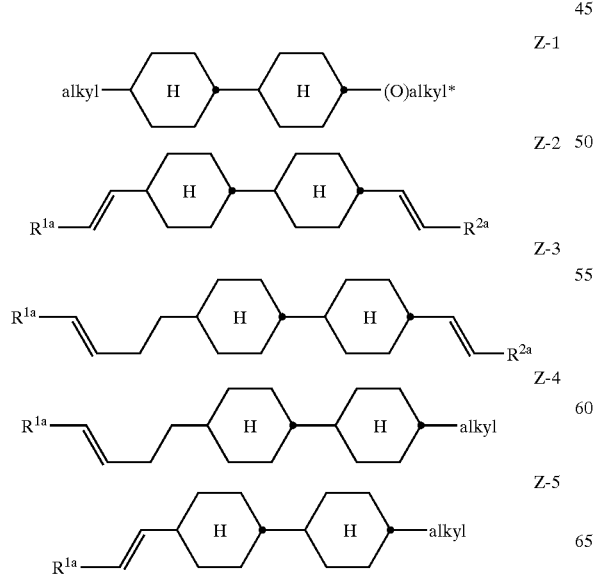

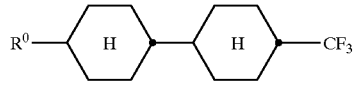

in which $R^{1a}$ and $R^{2a}$ are each, independently of one another, H, $CH_3$, $C_2H_5$ or $n$-$C_3H_7$. $R^0$, alkyl and alkyl* are as defined in claim 3 or as defined below.

Of the said bicyclic compounds, particular preference is given to the compounds Z-1, Z-2, Z-5 and Z-6.

The medium additionally comprises one, two or more compounds having fused rings, of the formulae AN1 to AN11:

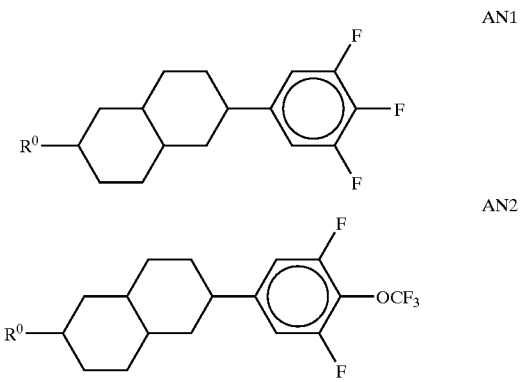

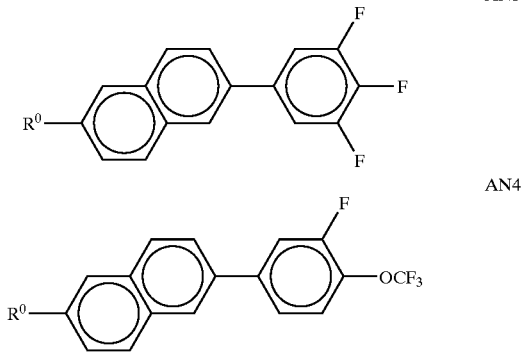

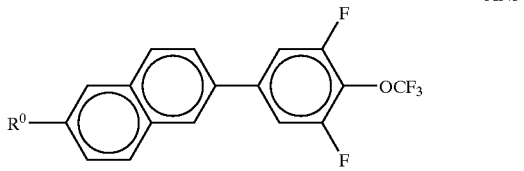

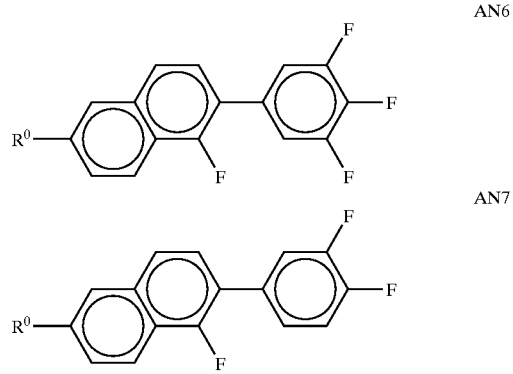

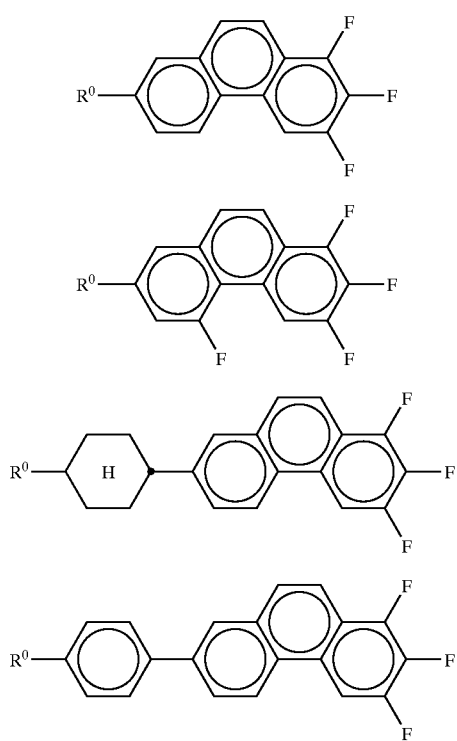

in which R⁰ is as defined above.

It has been found that even a relatively small proportion of compounds of the formulae I mixed with conventional liquid-crystal materials, but in particular with one or more compounds of the formulae II, III, IV, V and/or VI, results in a lowering of the threshold voltage and in low birefringence values, with broad nematic phases with low smectic-nematic transition temperatures being observed at the same time, improving the shelf life. Preference is given, in particular, to mixtures which, besides one or more compounds of the formulae I, comprise one or more compounds of the formula IV, in particular compounds of the formula IVa in which X⁰ is F or OCF₃. The compounds of the formulae I to VI are colorless, stable and readily miscible with one another and with other liquid-crystalline materials.

The term "alkyl" or "alkyl*" covers straight-chain and branched alkyl groups having 1–7 carbon atoms, in particular the straight-chain groups methyl, ethyl, propyl, butyl, pentyl, hexyl and heptyl. Groups having 1–5 carbon atoms are generally preferred.

The term "alkenyl" covers straight-chain and branched alkenyl groups having 2–7 carbon atoms, in particular the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+V+V+VI depends substantially on the desired properties, on the choice of the components of the formulae I, II, III, IV, V and/or VI, and on the choice of any other components that may be present. Suitable mixing ratios within the range given above can easily be determined from case to case.

The total amount of compounds of the formulae I to XIII in the mixtures according to the invention is not crucial. The mixtures can therefore comprise one or more further components for the purposes of optimization of various properties. However, the observed effect on the addressing times and the threshold voltage is generally greater, the higher the total concentration of compounds of the formulae I to XIII.

In a particularly preferred embodiment, the media according to the invention comprise compounds of the formulae II to VI (preferably II, III and/or IV, in particular IVa) in which X⁰ is F, OCF₃, OCHF₂, OCH=CF₂, OCF=CF₂ or OCF₂—CF₂H. A favorable synergistic effect with the compounds of the formulae I results in particularly advantageous properties. In particular, mixtures comprising compounds of the formula I and of the formula IVa are distinguished by their low threshold voltages.

The individual compounds of the formulae I to XVIII and their sub-formulae which can be used in the media according to the invention are either known or can be prepared analogously to the known compounds.

The construction of the MLC display according to the invention from polarizers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

C denotes a crystalline phase, S a smectic phase, $S_C$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2.0 times the value of $V_{10}$. $\Delta n$ denotes the optical anisotropy. $\Delta \epsilon$ denotes the dielectric anisotropy ($\Delta \epsilon = \epsilon_\| - \epsilon_\perp$, where $\epsilon_\|$ denotes the dielectric constant parallel to the longitudinal molecular axes and $\epsilon_\perp$ denotes the dielectric constant perpendicular thereto). The electro-optical data are measured in a TN cell at the 1st minimum (i.e. at a d·$\Delta n$ value of 0.5 μm) at 20° C., unless expressly stated otherwise. The optical data are measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are integers and are preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L_{1*}$ and $L^{2*}$:

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $C_mH_{2m+1}$ | H | H |
| nO.m | $C_nH_{2n+1}$ | $OC_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are given in Tables A and B.

TABLE A

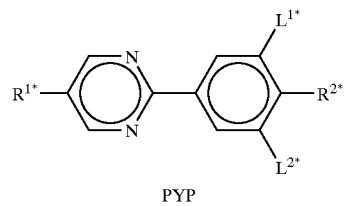

PYP

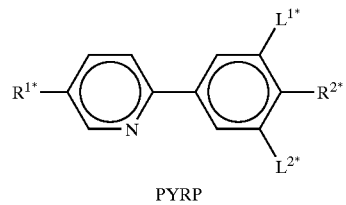

PYRP

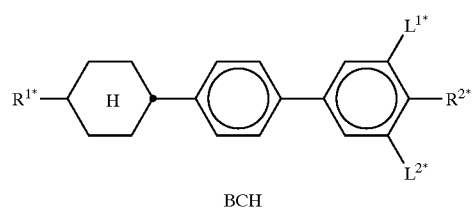

BCH

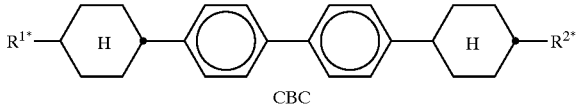

CBC

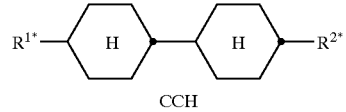

CCH

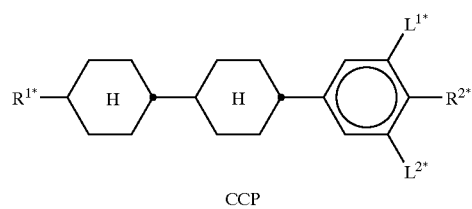

CCP

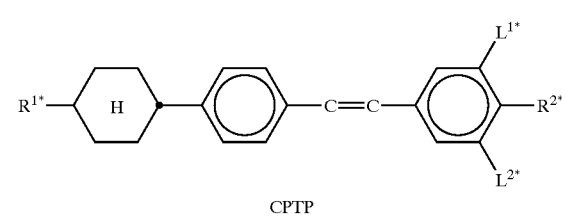

CPTP

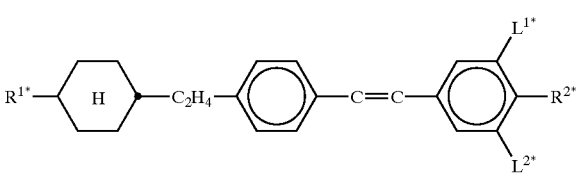

TABLE A-continued
CEPTP
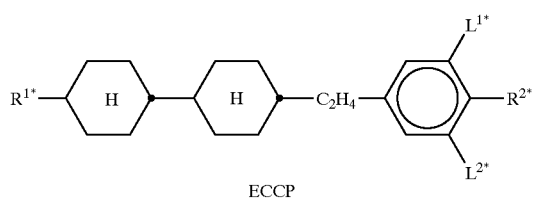
ECCP
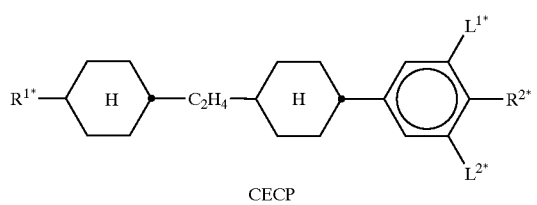
CECP
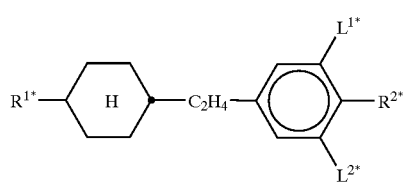
EPCH
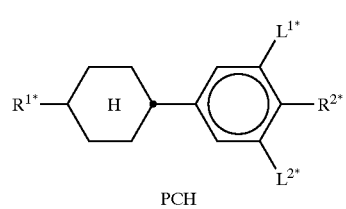
PCH
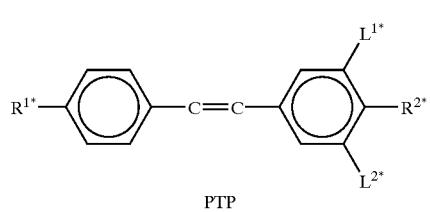
PTP
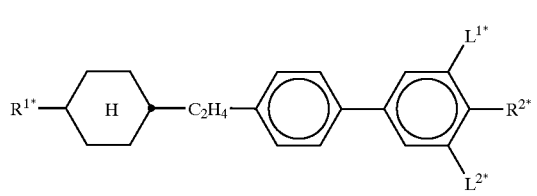
BECH
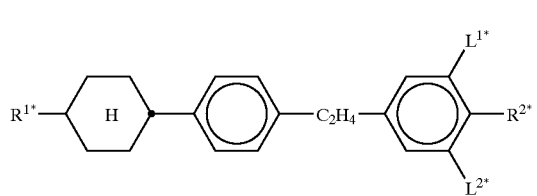
EBCH
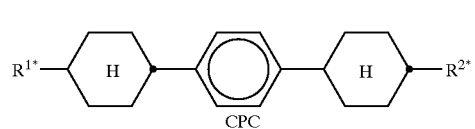
CPC
TABLE A-continued
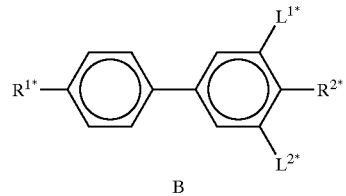
B
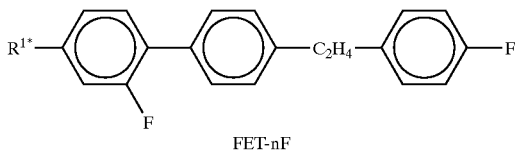
FET-nF
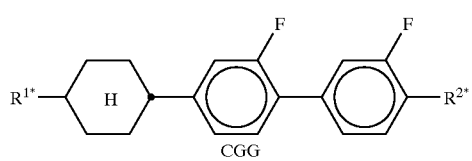
CGG
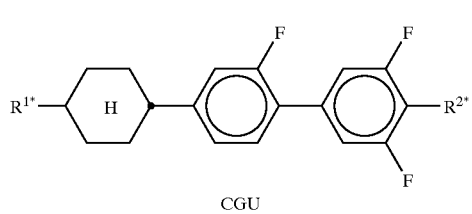
CGU
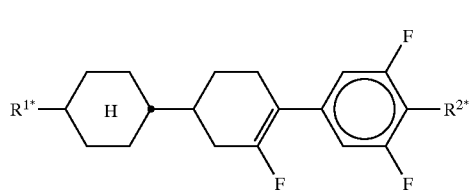
CFU
TABLE B
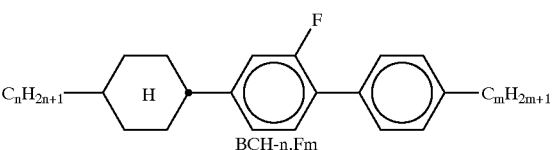
BCH-n.Fm
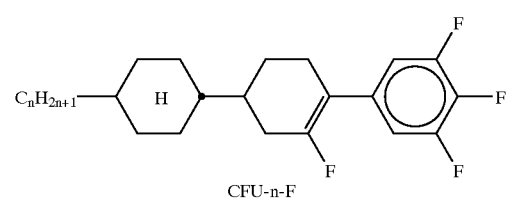
CFU-n-F
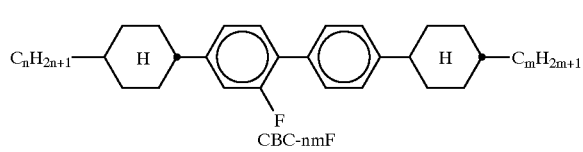
CBC-nmF TABLE B-continued
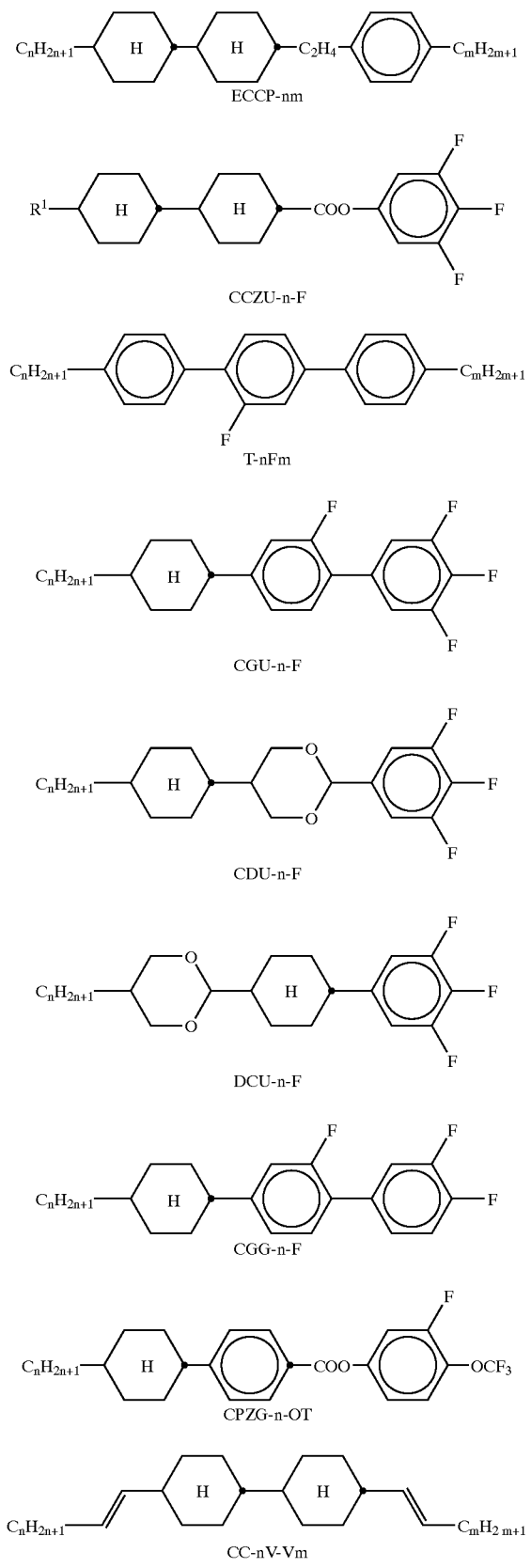
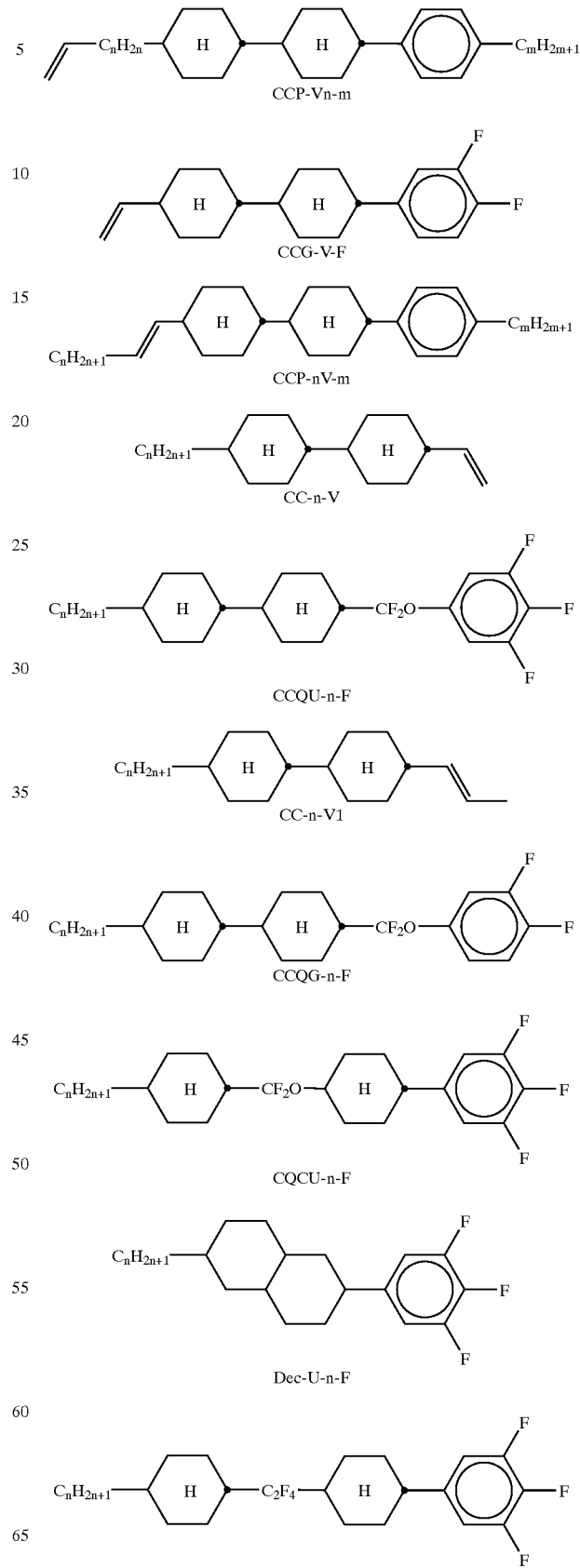

TABLE B-continued

CWCU-n-F

CWCG-n-F

CCOC-n-m

CPTU-n-F

GPTU-n-F

PQU-n-F

PUQU-n-F

PGU-n-F

CGZP-n-OT

CCGU-n-F

CCQG-n-F

CUQU-n-F

CCCQU-n-F

Particular preference is given to liquid-crystalline mixtures which, besides the compounds of the formula I, comprise at least one, two, three or four compounds from Table B.

TABLE C

Table C shows possible dopants which are generally added to the mixtures according to the invention.

C 15

CB 15

CM 21

TABLE C-continued

Table C shows possible dopants which are generally added to the mixtures according to the invention.

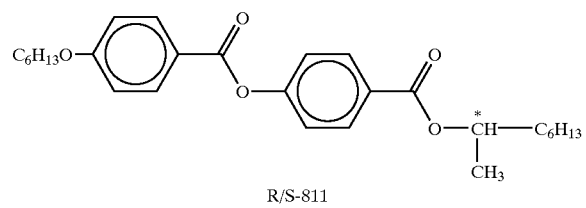

R/S-811

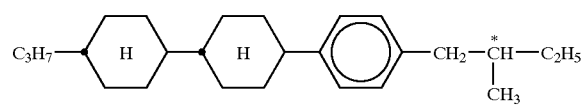

CM 44

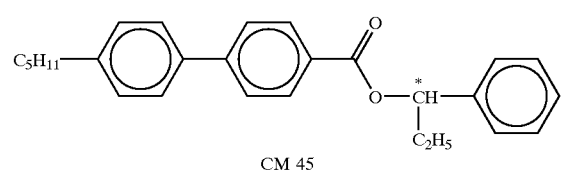

CM 45

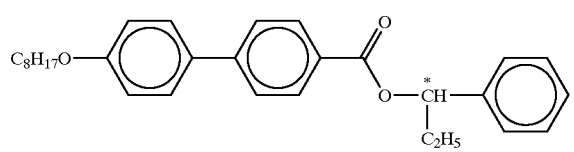

CM 47

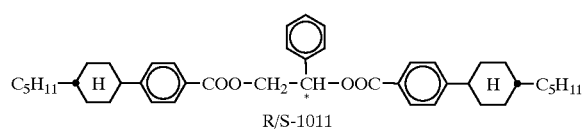

R/S-1011

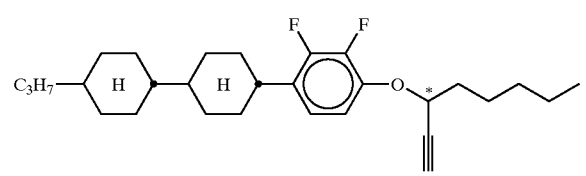

R/S-3011

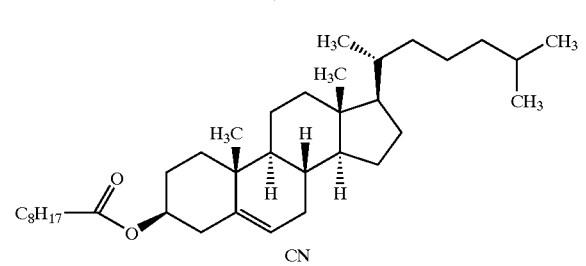

CN

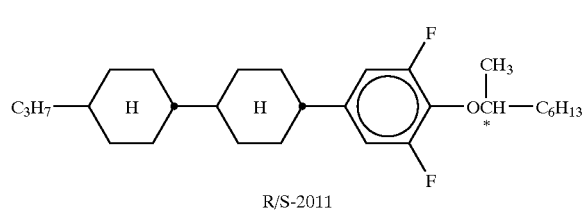

R/S-2011

TABLE C-continued

Table C shows possible dopants which are generally added to the mixtures according to the invention.

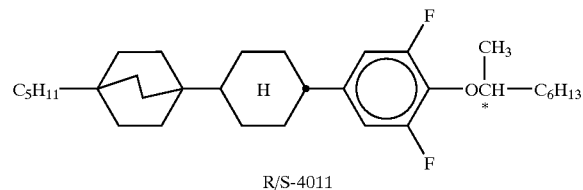

R/S-4011

Stabilisers which can be added, for example, to the mixtures according to the invention are mentioned below.

TABLE D

Stabilisers which can be added, for example, to the mixtures according to the invention are mentioned below.

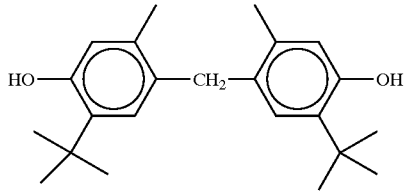

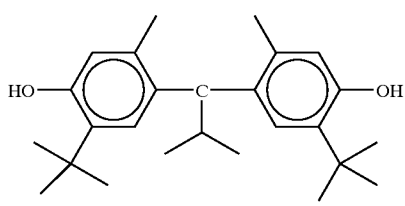

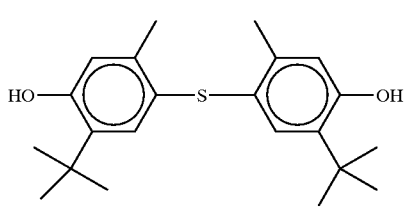

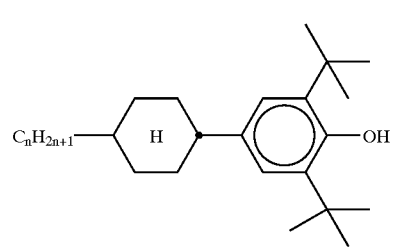

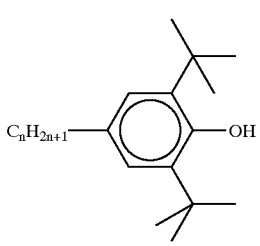

TABLE D-continued
Stabilisers which can be added, for example, to the mixtures according to the invention are mentioned below.
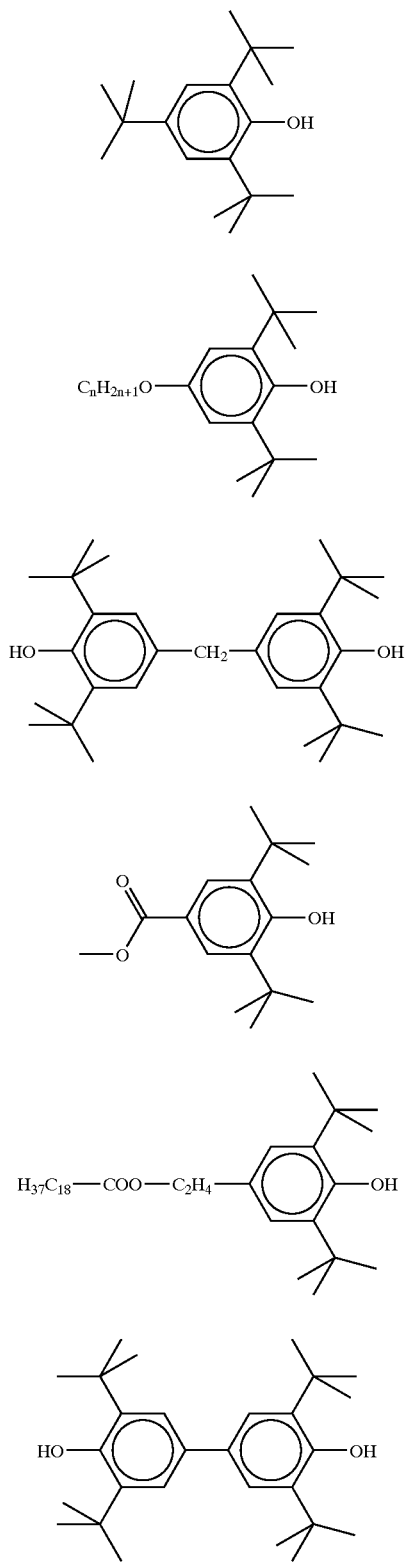
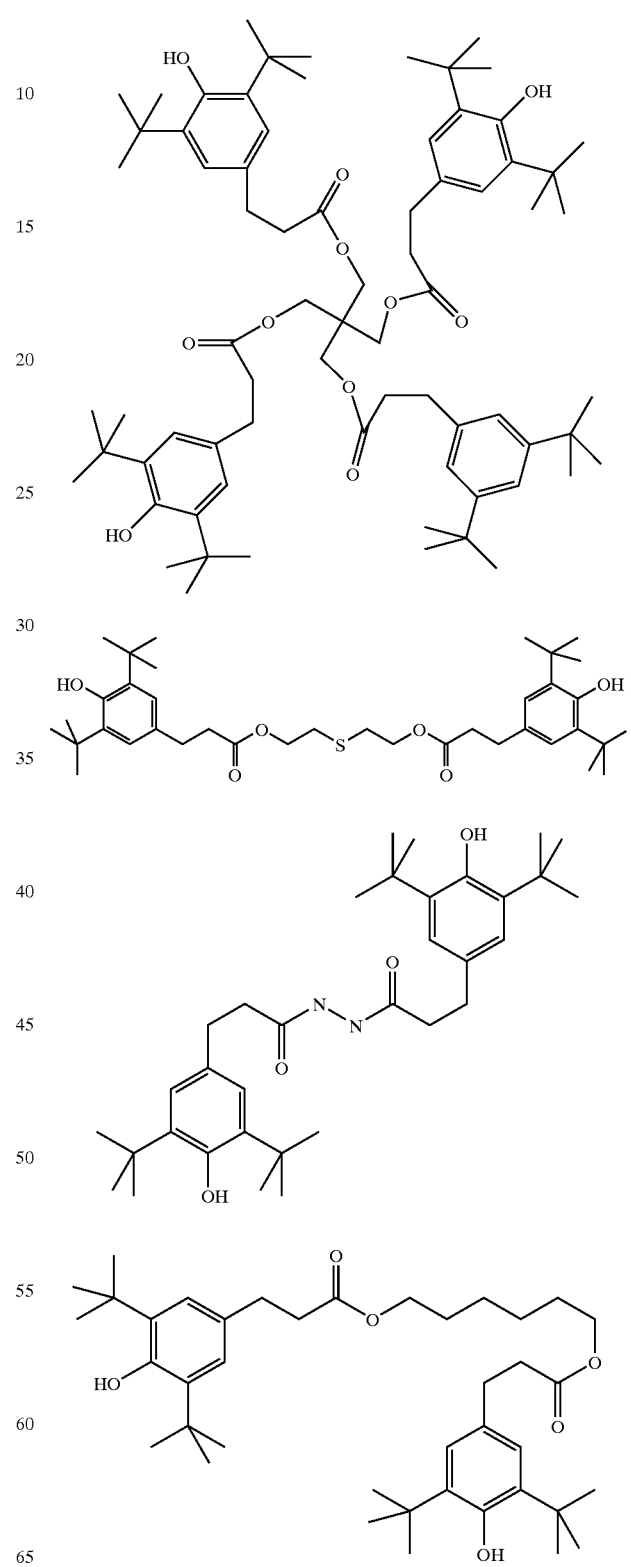

TABLE D-continued
Stabilisers which can be added, for example, to the mixtures according to the invention are mentioned below.
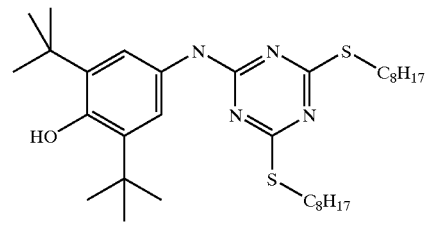
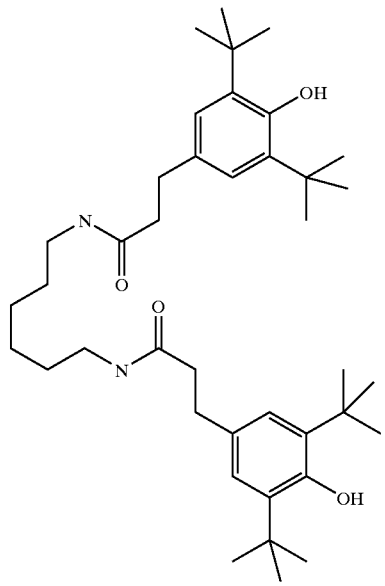
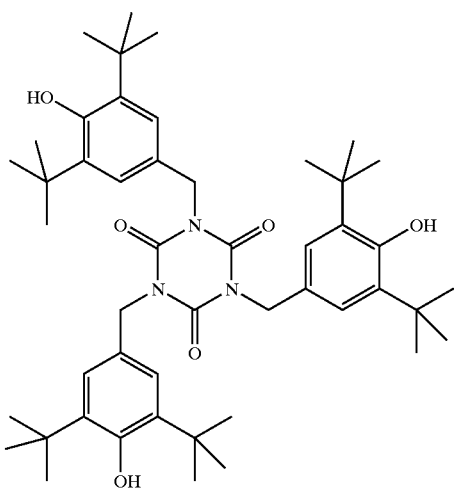
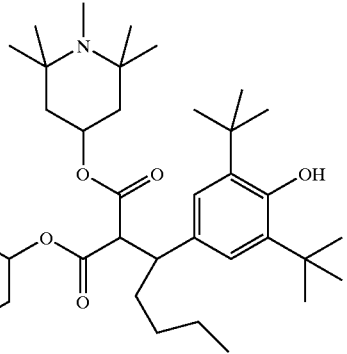
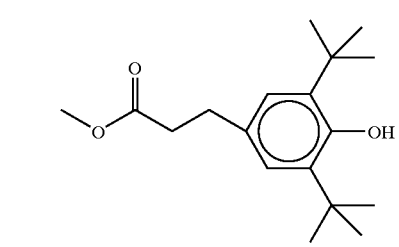
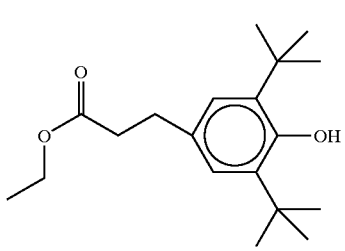
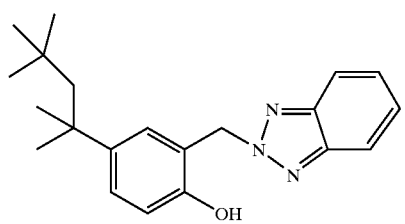
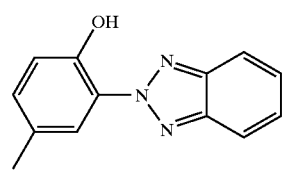
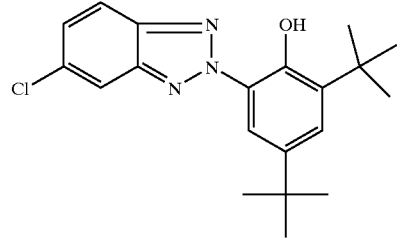

TABLE D-continued
Stabilisers which can be added, for example, to the mixtures according to the invention are mentioned below.
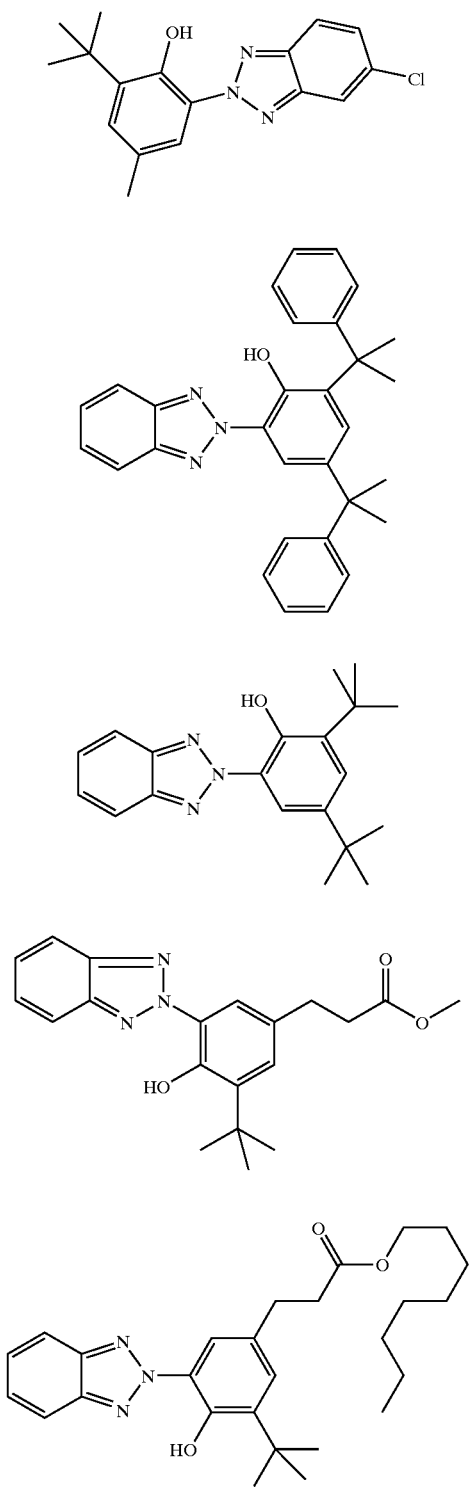
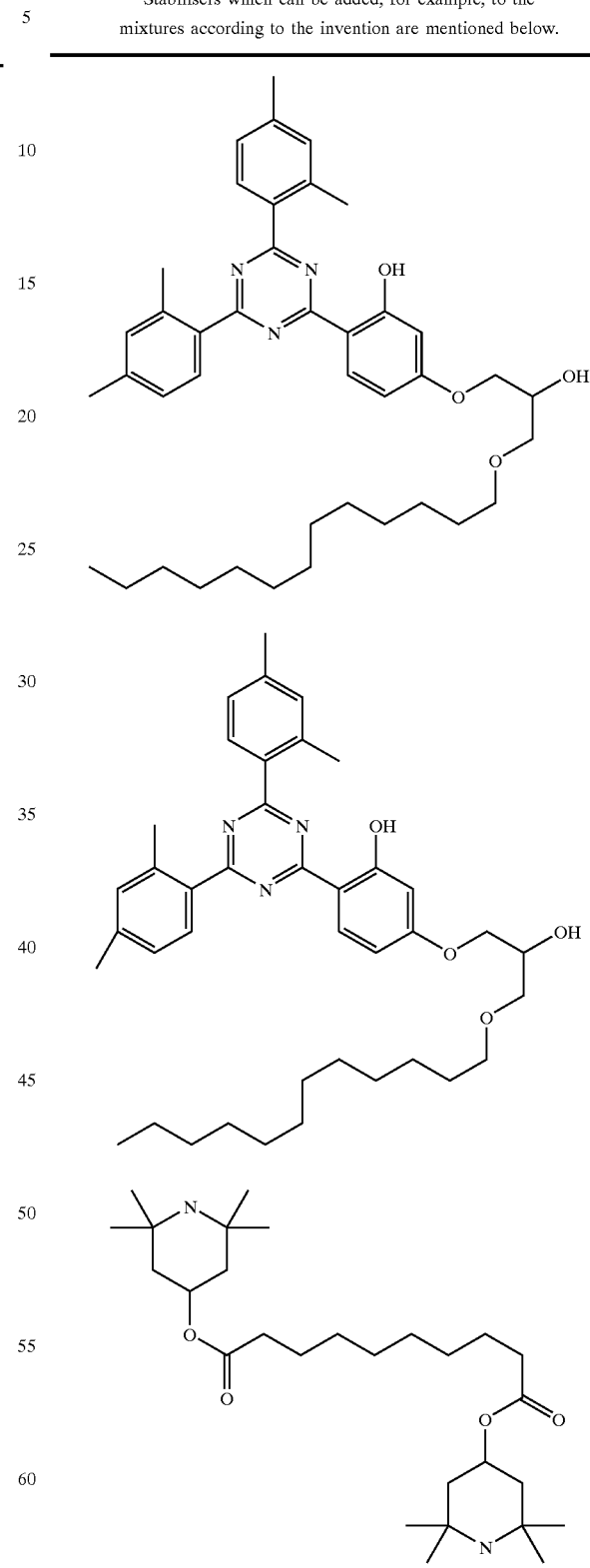

TABLE D-continued

Stabilisers which can be added, for example, to the mixtures according to the invention are mentioned below.

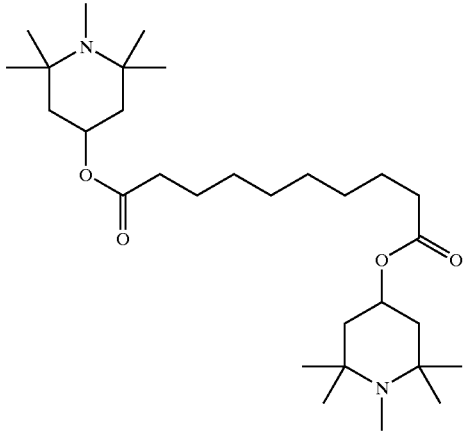

The entire disclosure of all applications, patents and publications, cited herein and of corresponding German patent application No. 102 23 061.7, filed May 24, 2002 is incorporated by reference herein.

EXAMPLES

The following examples are intended to explain the invention without restricting it. Above and below, percentages are percent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.). The flow viscosity $v_{20}$ (mm²/sec) and the rotational viscosity $\gamma_1$ (mPa·s) were each determined at 20° C.

Example M1

| | | | |
|---|---|---|---|
| CCH-5CF$_3$ | 8.00% | Clearing point [° C.]: | 83.0 |
| CCP-1F.F.F | 6.00% | Δn [589 nm, 20° C.]: | 0.0663 |
| CCP-2F.F.F | 8.00% | Δε [1 kHz, 20° C.]: | 11.7 |
| CCP-3F.F.F | 8.00% | $\gamma_1$ [mPa·s, 20° C.]: | 157 |
| CCOC-3-3 | 3.00% | d · Δn [20° C.]: | 0.50 |
| CCOC-3-5 | 3.00% | Twist [°]: | 90 |
| CCOC-4-3 | 4.00% | | |
| CCQU-1-F | 8.00% | | |
| CCQU-2-F | 9.00% | | |
| CCQU-3-F | 10.00% | | |
| CCCQU-3-F | 9.00% | | |
| CDU-2-F | 8.00% | | |
| CDU-3-F | 8.00% | | |
| CDU-5-F | 8.00% | | |

Example M2

| | | | |
|---|---|---|---|
| CCP-2F.F.F | 8.00% | Clearing point [° C.]: | 83.0 |
| CCH-34 | 12.00% | Δn [589 nm, 20° C.]: | 0.0659 |
| DCU-3-F | 6.00% | Δε [1 kHz, 20° C.]: | 12.3 |
| DCU-4-F | 8.00% | $\gamma_1$ [mPa·s, 20° C.]: | 148 |
| DCU-5-F | 8.00% | d · Δn [20° C.]: | 0.50 |
| CECU-2-F | 7.00% | Twist [°]: | 90 |
| CECU-3-F | 7.00% | $V_{10}$ [V]: | 1.16 |
| CECU-5-F | 8.00% | | |
| CCQU-1-F | 8.00% | | |
| CCQU-2-F | 8.00% | | |
| CCQU-3-F | 10.00% | | |
| CCCQU-3-F | 10.00% | | |

Example M3

| | | | |
|---|---|---|---|
| CCP-2F.F.F | 11.00% | Clearing point [° C.]: | 85.5 |
| CCP-3F.F.F | 11.00% | Δn [589 nm, 20° C.]: | 0.0754 |
| CCP-5F.F.F | 6.00% | Δε [1 kHz, 20° C.]: | 12.0 |
| CCZU-2-F | 4.00% | $\gamma_1$ [mPa·s, 20° C.]: | 155 |
| CCZU-3-F | 14.00% | d · Δn [20° C.]: | 0.50 |
| CCZU-5-F | 4.00% | Twist [°]: | 90 |
| CGU-2-F | 7.00% | $V_{10}$ [V]: | 1.11 |
| CGU-3-F | 4.00% | | |
| CCH-5CF$_3$ | 3.00% | | |
| CCOC-4-3 | 3.00% | | |
| CCQU-1-F | 8.00% | | |
| CCQU-2-F | 10.00% | | |
| CCQU-3-F | 9.00% | | |
| CCCQU-3-F | 6.00% | | |

Example M4

| | | | |
|---|---|---|---|
| CECU-2-F | 8.00% | Clearing point [° C.]: | 82.0 |
| CECU-3-F | 8.00% | Δn [589 nm, 20° C.]: | 0.0749 |
| CECU-5-F | 8.00% | Δε [1 kHz, 20° C.]: | 11.3 |
| CCP-2F.F.F | 9.00% | $\gamma_1$ [mPa·s, 20° C.]: | 156 |
| CCP-3F.F.F | 10.00% | | |
| CCZU-2-F | 3.00% | | |
| CCZU-3-F | 10.00% | | |
| CCZU-5-F | 3.00% | | |
| CCQU-1-F | 9.00% | | |
| CCQU-2-F | 6.00% | | |
| CCQU-3-F | 6.00% | | |
| CCCQU-3-F | 8.00% | | |
| PCH-7F | 5.00% | | |
| BCH-3F.F.F | 7.00% | | |

Example M5

| | | | |
|---|---|---|---|
| CCP-2F.F | 17.00% | Clearing point [° C.]: | 83.0 |
| CCP-3F.F | 6.00% | Δn [589 nm, 20° C.]: | 0.0791 |
| CCZU-2-F | 3.00% | $\gamma_1$ [mPa·s, 20° C.]: | 100 |
| CCZU-3-F | 9.00% | d · Δn [20° C.]: | 0.50 |
| CCP-31 | 9.00% | Twist [°]: | 90 |
| CCH-34 | 12.00% | $V_{10}$ [V]: | 1.65 |
| PCH-7F.F.F | 8.00% | | |
| CCP-3F | 5.00% | | |
| PCH-302 | 16.00% | | |
| PUQU-3-F | 7.00% | | |
| CCCQU-3-F | 8.00% | | |

Example M6

| | | | |
|---|---|---|---|
| BCH-3F.F.F | 18.00% | Clearing point [° C.]: | 83.0 |
| BCH-5F.F.F | 10.00% | Δn [589 nm, 20° C.]: | 0.1032 |

-continued

| | | | |
|---|---|---|---|
| BCH-2F.F | 9.00% | γ₁ [mPa · s, 20° C.]: | 158 |
| BCH-3F.F | 9.00% | d · Δn [20° C.]: | 0.50 |
| BCH-4F.F | 5.00% | Twist [°]: | 90 |
| CCP-2F.F | 8.00% | V₁₀ [V]: | 1.27 |
| DCU-3-F | 3.00% | | |
| DCU-4-F | 4.00% | | |
| DCU-5-F | 9.00% | | |
| CCP-31 | 7.00% | | |
| CCH-34 | 12.00% | | |
| CCCQU-3-F | 6.00% | | |

Example M7

| | | | |
|---|---|---|---|
| CCH-34 | 5.00% | Clearing point [° C.]: | 79.0 |
| PCH-5Cl | 8.00% | Δn [589 nm, 20° C.]: | 0.0923 |
| CCP-3F.F | 13.00% | γ₁ [mPa · s, 20° C.]: | 160 |
| CCP-2F.F.F | 9.00% | d · Δn [20° C.]: | 0.50 |
| CCP-4F.F.F | 6.00% | Twist [°]: | 90 |
| BCH-2F.F | 7.00% | V₁₀ [V]: | 1.22 |
| BCH-3F.F | 15.00% | | |
| BCH-5F.F.F | 7.00% | | |
| DCU-3-F | 3.00% | | |
| DCU-4-F | 5.00% | | |
| DCU-5-F | 8.00% | | |
| CCCQU-3-F | 7.00% | | |
| CCP-31 | 7.00% | | |

Example M8

| | | | |
|---|---|---|---|
| CCH-34 | 6.00% | Clearing point [° C.]: | 80.0 |
| PCH-5Cl | 8.00% | Δn [589 nm, 20° C.]: | 0.0932 |
| CCP-3F.F | 14.00% | γ₁ [mPa · s, 20° C.]: | 135 |
| CCP-4F.F | 13.00% | d · Δn [20° C.]: | 0.50 |
| CCP-2F.F.F | 9.00% | Twist [°]: | 90 |
| CCP-4F.F.F | 8.50% | V₁₀ [V]: | 1.25 |
| BCH-2F.F | 4.00% | | |
| CCCQU-3-F | 8.00% | | |
| CCP-31 | 9.00% | | |
| PUQU-2-F | 6.00% | | |
| PUQU-3-F | 8.00% | | |
| PUQU-5-F | 6.50% | | |

Example M9

| | | | |
|---|---|---|---|
| CCP-2F.F | 4.50% | Clearing point [° C.]: | 78.5 |
| CCP-3F.F | 13.00% | Δn [589 nm, 20° C.]: | 0.0797 |
| CCP-2F.F.F | 6.50% | γ₁ [mPa · s, 20° C.]: | 125 |
| PCH-7F.F.F | 9.00% | d · Δn [20° C.]: | 0.50 |
| CCZU-2-F | 3.00% | Twist [°]: | 90 |
| CCZU-3-F | 10.00% | V₁₀ [V]: | 1.24 |
| CCZU-4-F | 3.00% | | |
| DCU-3-F | 2.50% | | |
| DCU-4-F | 5.00% | | |
| PUQU-2-F | 6.00% | | |
| PUQU-3-F | 2.50% | | |
| CCP-3F | 3.00% | | |
| CCP-31 | 9.00% | | |
| CCH-34 | 5.00% | | |
| PCH-302 | 10.00% | | |
| CCCQU-3-F | 8.00% | | |

Example M10

| | | | |
|---|---|---|---|
| CCP-3F.F | 12.50% | Clearing point [° C.]: | 80.0 |
| CCP-2F.F.F | 5.00% | Δn [589 nm, 20° C.]: | 0.080 |
| PCH-7F.F.F | 8.00% | γ₁ [mPa · s, 20° C.]: | 140 |
| CCZU-2-F | 3.00% | d · Δn [20° C.]: | 0.50 |
| CCZU-3-F | 10.00% | Twist [°]: | 90 |
| CCZU-4-F | 3.00% | V₁₀ [V]: | 1.25 |
| DCU-3-F | 3.00% | | |
| DCU-4-F | 5.00% | | |
| DCU-5-F | 8.00% | | |
| BCH-3F.F.F | 9.50% | | |
| CCP-31 | 9.00% | | |
| CCH-34 | 5.00% | | |
| PCH-302 | 11.00% | | |
| CCCQU-3-F | 8.00% | | |

Example M11

| | | | |
|---|---|---|---|
| BCH-3F.F | 10.80% | Clearing point [° C.]: | 107.5 |
| BCH-5F.F | 9.00% | Δn [589 nm, 20° C.]: | 0.0970 |
| ECCP-30CF₃ | 4.50% | ν [kHz, 20° C.]: | 5.9 |
| ECCP-50CF₃ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF₃ | 7.20% | | |
| CCP-30CF₃ | 10.80% | | |
| CCP-40CF₃ | 6.30% | | |
| CCP-50CF₃ | 9.90% | | |
| PCH-5F | 9.00% | | |
| CCCQU-3-F | 10.00% | | |

Example M12

| | | | |
|---|---|---|---|
| BCH-3F.F | 10.91% | Clearing point [° C.]: | 106.0 |
| BCH-5F.F | 9.09% | | |
| ECCP-30CF₃ | 4.55% | | |
| ECCP-50CF₃ | 4.55% | | |
| CBC-33F | 1.82% | | |
| CBC-53F | 1.82% | | |
| CBC-55F | 1.82% | | |
| PCH-6F | 7.27% | | |
| PCH-7F | 5.45% | | |
| CCP-20CF₃ | 7.27% | | |
| CCP-30CF₃ | 10.91% | | |
| CCP-40CF₃ | 6.36% | | |
| CCP-50CF₃ | 10.00% | | |
| PCH-5F | 9.09% | | |
| CCCQU-3-F | 9.10% | | |

Example M13

| | | | |
|---|---|---|---|
| CCH-301 | 12.59% | Clearing point [° C.]: | 97.5 |
| CCH-3CF₃ | 7.20% | Δn [589 nm, 20° C.]: | 0.0639 |
| CCH-501 | 9.89% | ν [kHz, 20° C.]: | 7.3 |
| CCP-2F.F.F | 8.99% | | |
| CCP-3F.F.F | 11.69% | | |
| CCP-5F.F.F | 4.50% | | |
| CCPC-33 | 2.70% | | |
| CCZU-2-F | 4.50% | | |
| CCZU-3-F | 15.29% | | |
| CCZU-5-F | 4.50% | | |

-continued

| | |
|---|---|
| CH-33 | 2.70% |
| CH-35 | 2.70% |
| CH-43 | 2.70% |
| CCCQU-3-F | 10.06% |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds of positive dielectric anisotropy, wherein the medium comprises one or more compounds of the formula I

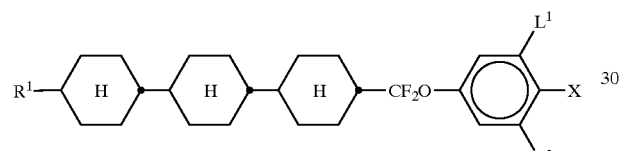

I in which $R^1$ is a halogenated or unsubstituted alkyl or alkoxy radical having from 1 to 15 carbon atoms, where one or more $CH_2$ groups in these radicals are optionally, independently of one another, replaced by —C≡C—, —CH=CH—, —O—, —CO—O— or —O—CO— in such a way that O atoms are not linked directly to one another, X is $SF_5$, and $L^1$ and $L^2$ are each, independently of one another, H or F.

2. A liquid-crystalline medium according to claim 1, which comprises one, two or more compounds of the formula I-5:

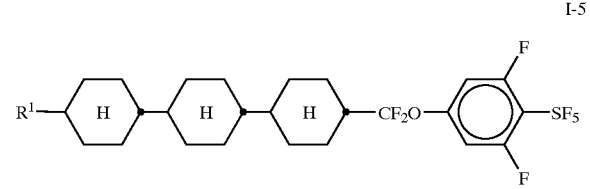

I-5 in which $R^1$ is as defined in claim 1.

3. A liquid-crystalline medium according to claim 1, which further comprises one or more compounds selected from the group consisting of those of the formulae II, III, IV, V and VI:

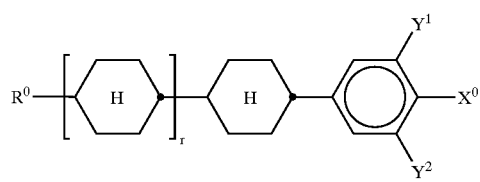

II

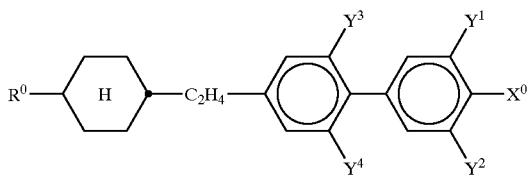

III

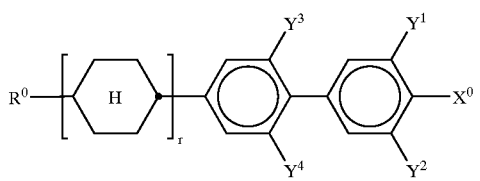

IV

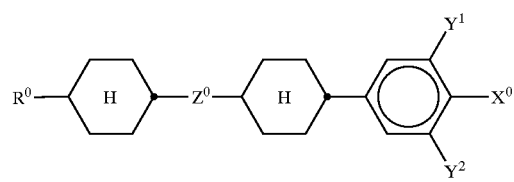

V

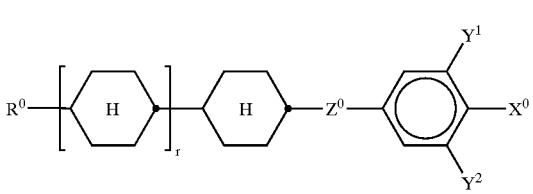

VI in which the individual radicals have the following meanings:

$R^0$ is n-alkyl, oxaalkyl, fluoroalkyl or alkenyl, each having 1 to 9 carbon atoms, $X^0$ is F, Cl, halogenated alkyl, halogenated alkenyl, halogenated alkenyloxy or halogenated alkoxy having 1 to 6 carbon atoms, $Z^0$ is —$C_2F_4$—, —CF=CF—, —$C_2H_4$—, —$(CH_2)_4$—, —$OCH_2$—, —$CH_2O$—, —$CF_2O$— or —$OCF_2$—, $Y^1$ to $Y^4$ are each, independently of one another, H or F, and r is 0 or 1.

4. A liquid-crystalline medium according to claim 2 which further comprises one or more compounds selected from the group consisting of those of the formulae II, III, IV, V and VI:

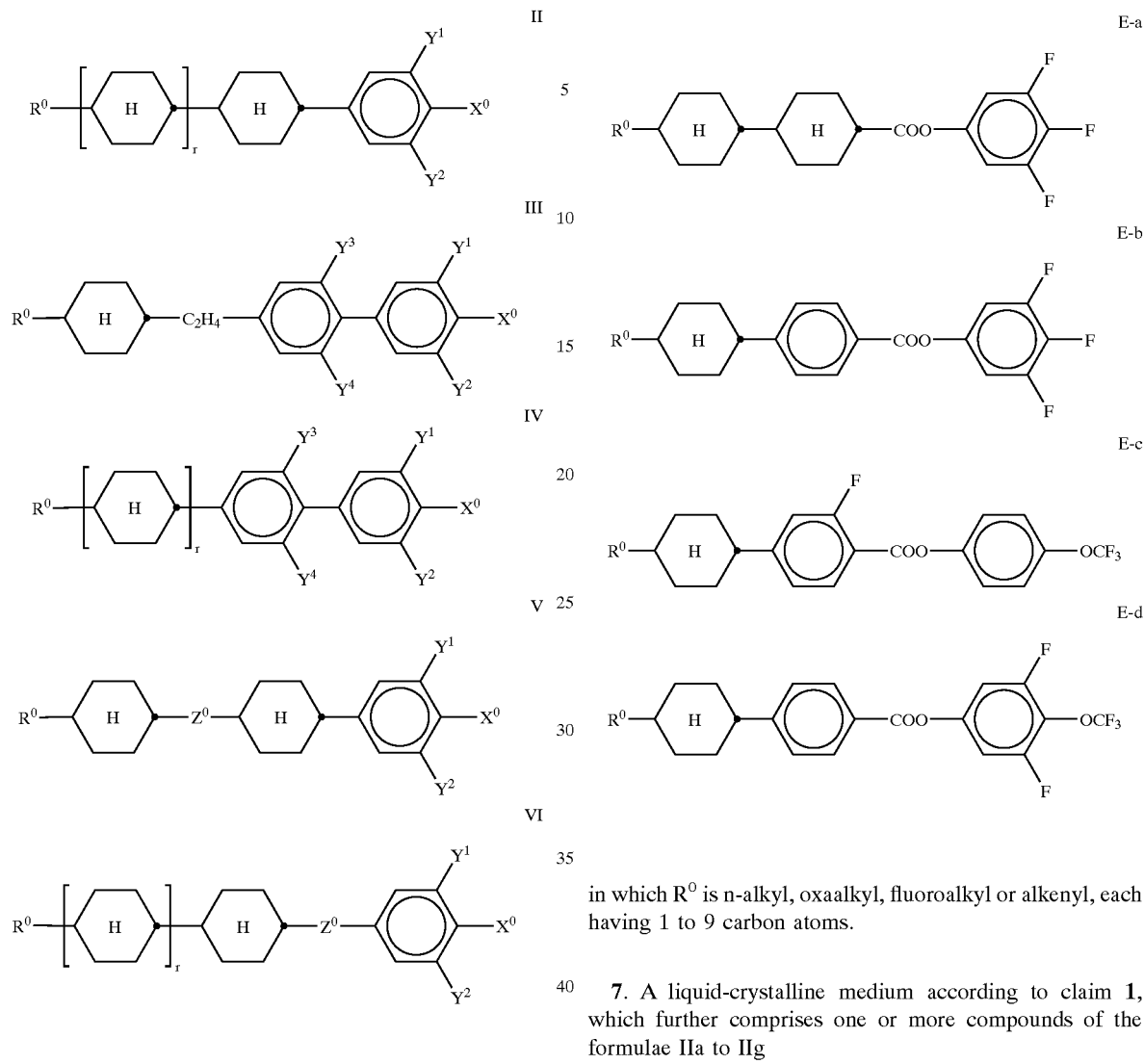

in which the individual radicals have the following meanings:

$R^0$ is n-alkyl, oxaalkyl, fluoroalkyl or alkenyl, each having 1 to 9 carbon atoms, $X^0$ is F, Cl, halogenated alkyl, halogenated alkenyl, halogenated alkenyloxy or halogenated alkoxy having 1 to 6 carbon atoms, $Z^0$ is $—C_2F_4—$, $—CF{=}CF—$, $—C_2H_4—$, $—(CH_2)4—$, $—OCH_2—$, $—CH_2O—$, $—CF_2O—$ or $—OCF_2—$, $Y^1$ to $Y^4$ are each, independently of one another, H or F, and r is 0 or 1.

5. A liquid-crystalline medium according to claim 3, wherein the proportion of compounds of the formulae I to VI together in the mixture as a whole is at least 50% by weight.

6. A liquid-crystalline medium according to claim 1, which further comprises one or more compounds of the formulae E-a to E-d:

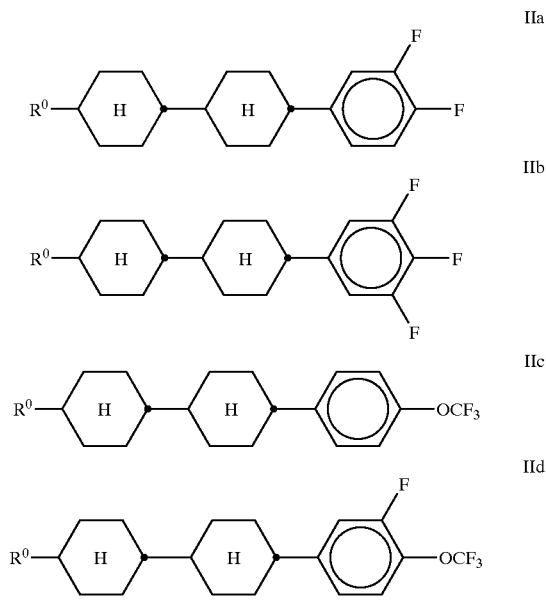

in which $R^0$ is n-alkyl, oxaalkyl, fluoroalkyl or alkenyl, each having 1 to 9 carbon atoms.

7. A liquid-crystalline medium according to claim 1, which further comprises one or more compounds of the formulae IIa to IIg

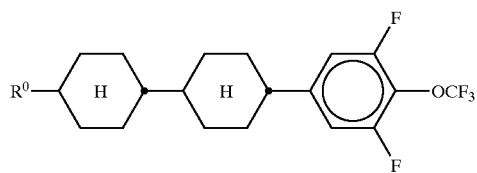

IIe

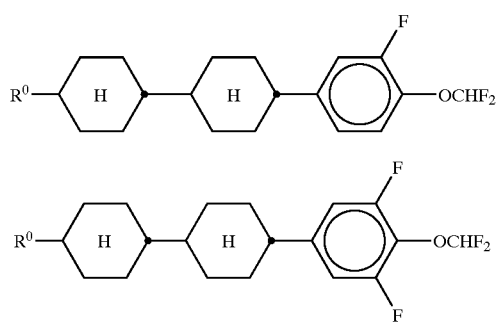

IIf

IIg in which R⁰ is n-alkyl, oxaalkyl, fluoroalkyl or alkenyl, each having 1 to 9 carbon atoms.

8. A liquid-crystalline medium according to claim 1, which further comprises one or more compounds of the formulae O1 and/or O2:

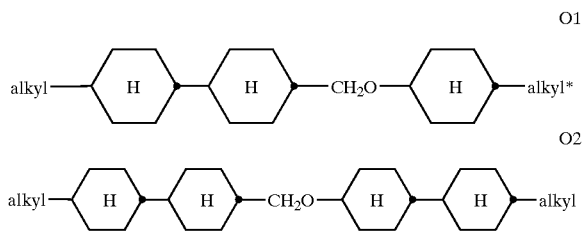

O1

O2 in which alkyl and alkyl* are each, independently of one another, a straight-chain or branched alkyl group having 1–7 carbon atoms.

9. A liquid-crystalline medium according to claim 1, which further comprises one or more dioxane compounds of the formulae D1 and/or D2:

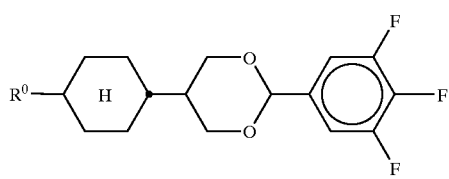

D1

D2 in which

R⁰ is n-alkyl, oxaalkyl, fluoroalkyl or alkenyl, each having 1 to 9 carbon atoms.

10. A liquid-crystalline medium according to claim 1, wherein the proportion of compounds of the formula I in the mixture as a whole is from 0.5 to 40% by weight.

11. An electro-optical liquid-crystal display containing a liquid-crystalline medium according to claim 1.

12. A liquid-crystalline medium according to claim 6, wherein the proportion of the compounds of the formulae E-a to E-d in the medium is 10–30% by weight.

13. A liquid-crystalline medium according to claim 8, wherein the proportion of the compounds of the formulae O1 and/or O2 in the medium is 5–10% by weight.

14. A liquid-crystalline medium according to claim 1, wherein the medium further comprises 5–35% by weight of a compound of the formula IVa:

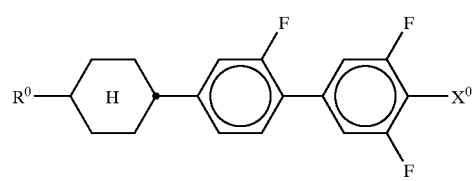

IVa in which the individual radicals have the following meanings:

R⁰ is n-alkyl, oxaalkyl, fluoroalkyl or alkenyl, each having 1 to 9 carbon atoms, X⁰ is F, Cl, halogenated alkyl, halogenated alkenyl, halogenated alkenyloxy or halogenated alkoxy having 1 to 6 carbon atoms.

15. The medium of claim 14, which comprises one, two or three compounds of the formula IVa in which X⁰ is F or OCF₃.

16. An electro-optical liquid-crystal display of claim 11, wherein the display is a STN or MLC display.

17. A liquid-crystalline medium of claim 1, wherein the medium retains the nematic phase at least down to −20° C., has a clearing point above 60° C., a dielectric anisotropy, Δ∈ of ≧6 and a TN threshold below 2.0 V.

18. A liquid-crystalline medium of claim 1, wherein the medium has a flow viscosity, $v_{20}$, at 20° C., <60 mm²·s⁻¹, a rotational viscosity, $\gamma_1$, at 20° C., of <160 mPa·s, and a nematic phase range of at least 90°C.

* * * * *